(12) United States Patent
Fairfax et al.

(10) Patent No.: US 10,999,081 B2
(45) Date of Patent: May 4, 2021

(54) DYNAMIC CERTIFICATE MANAGEMENT FOR A DISTRIBUTED AUTHENTICATION SYSTEM

(71) Applicant: Microsoft Technology Licensing, LLC, Redmond, WA (US)

(72) Inventors: Ryan J. Fairfax, Kirkland, WA (US); Felix Stefan Domke, Luebeck (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 15/989,497

(22) Filed: May 25, 2018

(65) Prior Publication Data
US 2019/0319807 A1    Oct. 17, 2019

Related U.S. Application Data

(60) Provisional application No. 62/656,476, filed on Apr. 12, 2018.

(51) Int. Cl.
| | |
|---|---|
| *H04L 29/06* | (2006.01) |
| *H04L 9/32* | (2006.01) |
| *G06F 21/57* | (2013.01) |
| *G06F 21/44* | (2013.01) |

(52) U.S. Cl.
CPC .......... *H04L 9/3265* (2013.01); *G06F 21/44* (2013.01); *G06F 21/575* (2013.01); *H04L 9/3247* (2013.01); *H04L 9/3268* (2013.01); *H04L 63/0876* (2013.01); *H04L 63/12* (2013.01)

(58) Field of Classification Search
CPC ... H04L 9/3265; H04L 9/3268; H04L 9/3247; H04L 9/3263; H04L 63/0876; H04L 63/123; H04L 63/12; H04L 63/0823; G06F 21/44
See application file for complete search history.

(56) References Cited

U.S. PATENT DOCUMENTS

| | | | | |
|---|---|---|---|---|
| 8,171,283 | B2 * | 5/2012 | Pietrowicz | G06Q 20/3829 368/6 |
| 8,799,997 | B2 * | 8/2014 | Spiers | H04L 63/0218 726/3 |
| 9,300,473 | B2 * | 3/2016 | Nix | H04L 9/3263 |
| 9,306,911 | B2 * | 4/2016 | Walter | H04L 63/08 |
| 9,565,172 | B2 * | 2/2017 | Stahl | G06F 21/33 |
| 9,998,449 | B2 * | 6/2018 | Lee | H04L 63/0853 |
| 10,136,315 | B2 * | 11/2018 | Gong | H04L 63/0869 |

* cited by examiner

*Primary Examiner* — Hosuk Song
(74) *Attorney, Agent, or Firm* — Davin Chin; Chin IP, PLLC

(57) ABSTRACT

The disclosed technology is generally directed to embedded device updates. In one example of the technology, a request for a nonce from a device is received. The nonce is sent in response to the request. An authentication request that includes the nonce, a set of measurements associated with the device, and a cryptographic signature generated from a private key associated with the device is received. The device is validated based on the authentication request. In response to successful validation of the device, a short-term certificate is generated for the device.

20 Claims, 8 Drawing Sheets

DYNAMIC CERTIFICATE MANAGEMENT FOR A DISTRIBUTED AUTHENTICATION SYSTEM

CROSS-REFERENCE TO RELATED APPLICATION(S)

This application claims priority to U.S. Provisional Pat. App. No. 62/656,476, filed Apr. 12, 2018, entitled "DYNAMIC CERTIFICATE MANAGEMENT FOR A DISTRIBUTED AUTHENTICATION SYSTEM". The entirety of this afore-mentioned application is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to the authentication of software. In one example of the technology, a request for a nonce from a device is received. In some examples, the nonce is sent in response to the request. In some examples, an authentication request that includes the nonce, a set of measurements associated with the device, and a cryptographic signature generated from a private key associated with the device is received. In some examples, the device is validated based on the authentication request. In some examples, in response to successful validation of the device, a short-term certificate is generated for the device.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
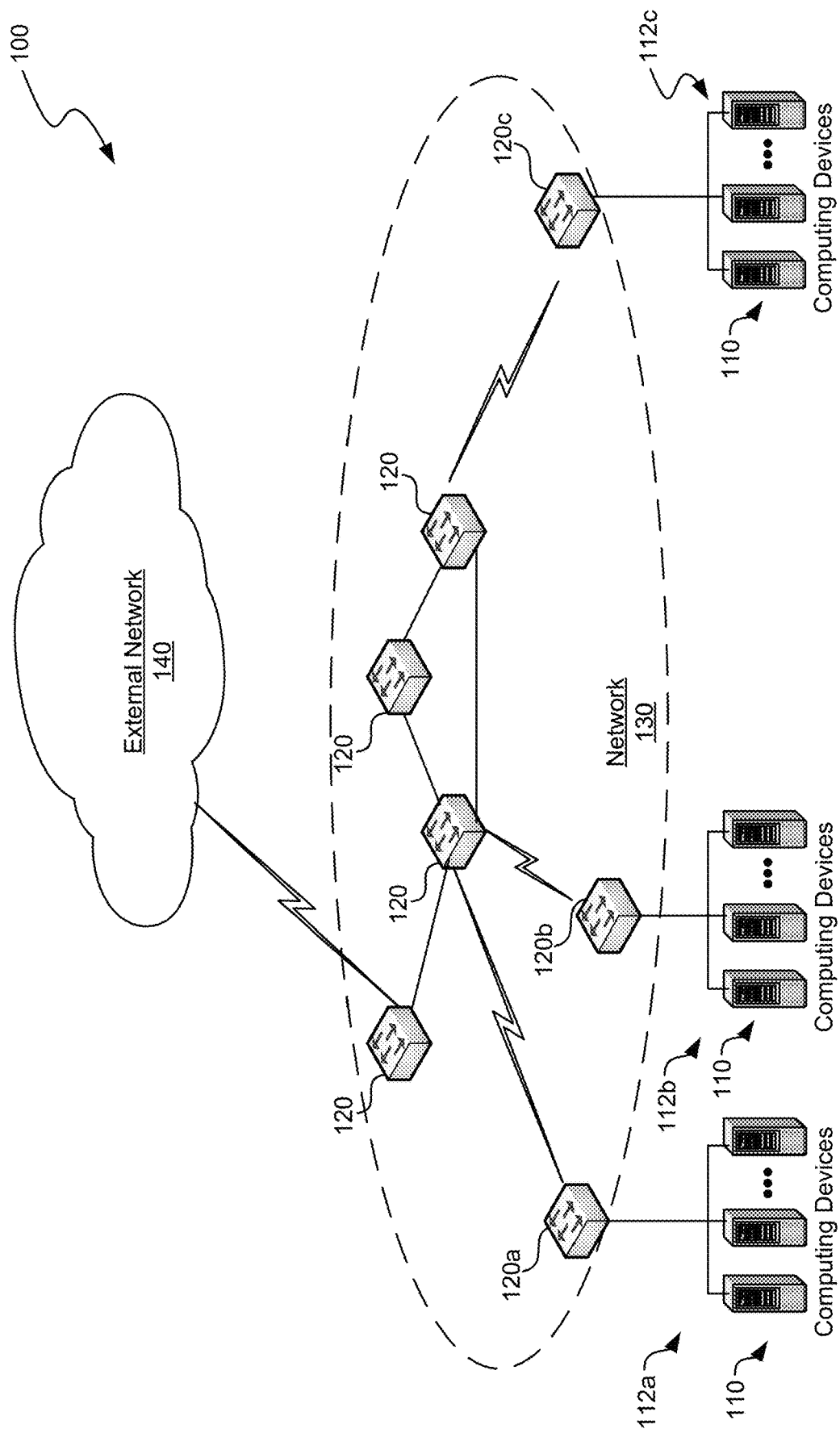
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to device authentication and attestation. In one example of the technology, a request for a nonce from a device is received. In some examples, the nonce is sent in response to the request. In some examples, an authentication request that includes the nonce, a set of measurements associated with the device, and a cryptographic signature generated from a private key associated with the device is received. In some examples, the device is validated based on the authentication request. In some examples, in response to successful validation of the device, a short-term certificate is generated for the device.

Authentication and attestation of a device may be accomplished via verification of a set of measurements received from a device. The set of measurements may include a verifiable list of all software, including the versions of the software, running on the device, and a signature by a private key of the device. Upon successful authentication and attestation of the device, a short-term certificate may be issued to the device. The short-term may expire after a relatively short period of time, such as 24 hours. Until the short-term certificate expires, the short-term certification may be used to authenticate the device to other services.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT hub, a device comprising part or all of an application back-end, or the like, as discussed in greater detail below.

Illustrative Computing Device

Figure 2:
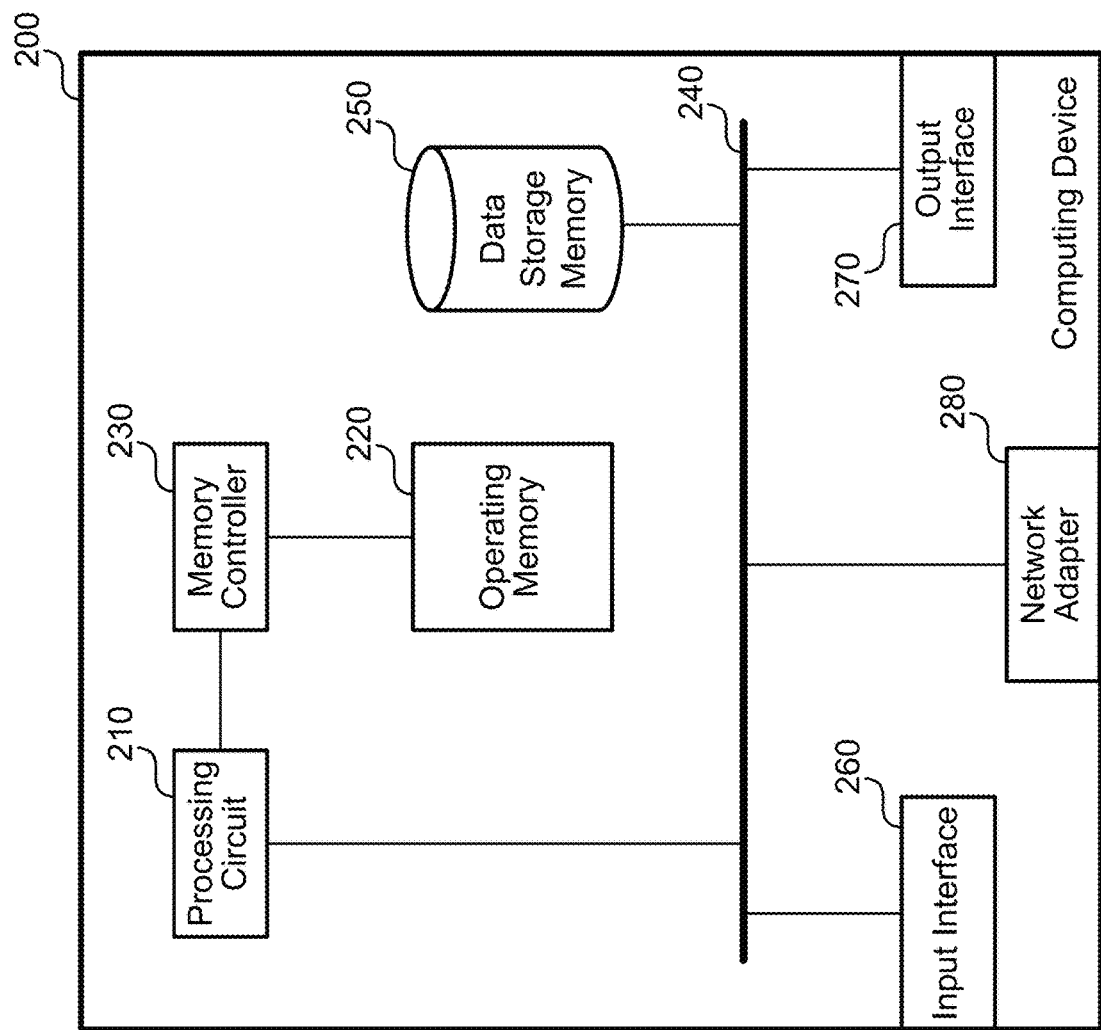
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. Processing circuit 210 is an example of a core. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process. In some examples, other forms of execution may be employed, such as execution directly from data storage memory 250, e.g., eXecute In Place (XIP).

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudostatic random access memory (PSRAM), or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output (GPIO), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, SigFox, LoRa, Powerline, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions.

Illustrative Systems

Figure 3:
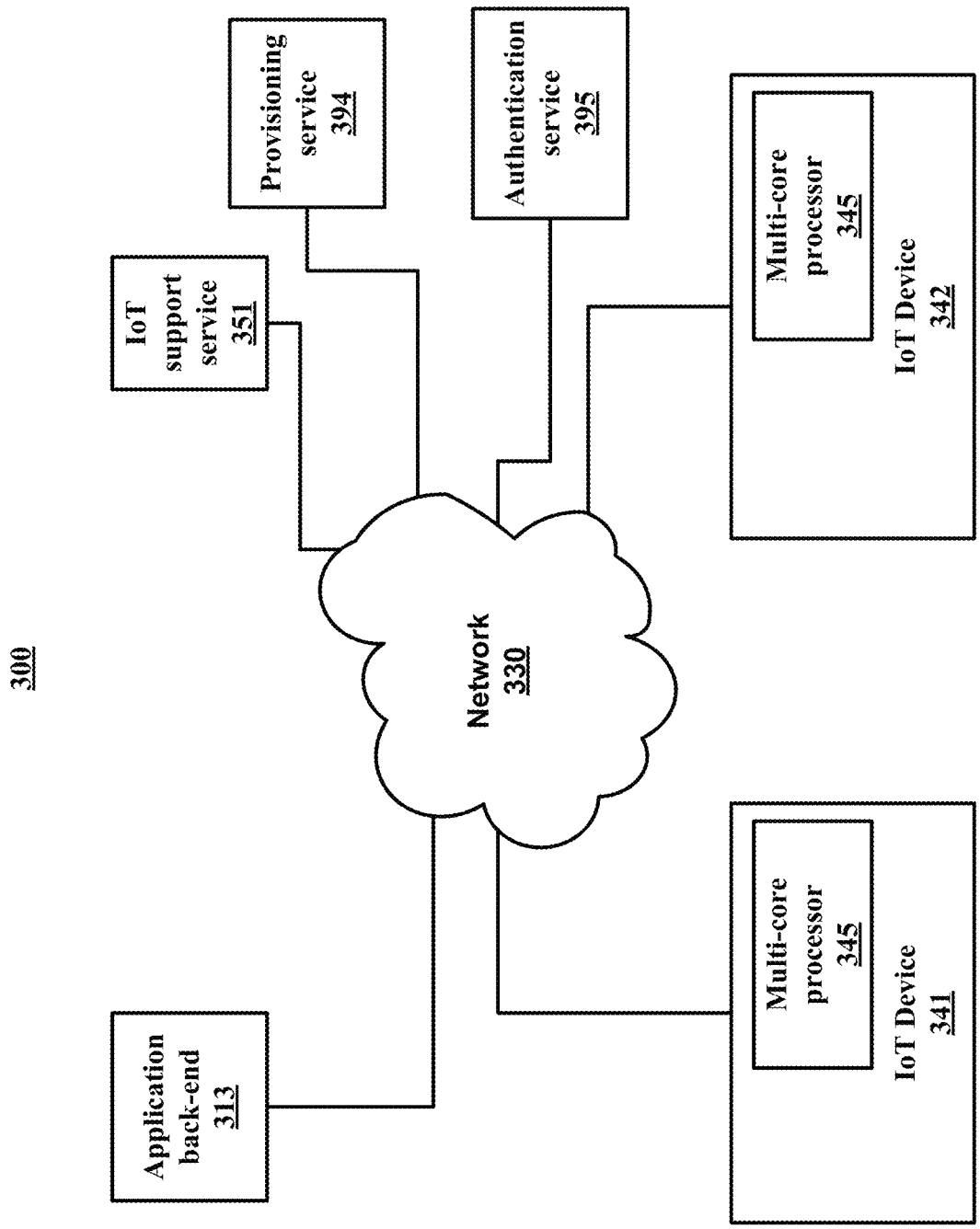
FIG. 3 is a block diagram illustrating an example of a system.

FIG. 3 is a block diagram illustrating an example of a system (300). System 300 may include network 330, IoT support service 351, IoT devices 341 and 342, and application back-end 313, provisioning service 394, and authentication service 395, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, and/or personalization of settings. However, the foregoing list merely includes some of the many possible users for IoT services. Such services may be employed for, or in conjunction with, numerous other applications, whether or not such applications are discussed herein.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. In some examples, at least some of the actions taken by the application back-end may be performed by applications running in application back-end 313.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

Each of the IoT devices 341 and 342, and/or the devices that comprise IoT support service 351 and/or application back-end 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

In some examples, when IoT devices such as IoT device 341 and IoT device 342 are manufactured, an attestation key pair is generated. In some examples, the attestation key pair includes an attestation private key and an attestation public key. In some examples, the private attestation key is burned into fuses and are not readable by software on the device. In some examples, the public key is also burned into fuses but is exportable and readable. In some examples, the IoT device is provisioned by provisioning service 394 when the IoT device is first activated by a customer. In some examples, during provisioning, the public attestation key is sent to authentication service 395 for ingestion into authentication service databases.

In some examples, upon ingestion into the authentication service databases, authentication service 395 generates a device certificate for each provided public key. In some examples, this device certificate is issued for the public attestation key of the device and signed by a common issuer. In some examples, this certificate contains the public key of the device and is signed as being a valid device. In some examples, because no secrets are stored in this certificate, the certificate itself isn't security sensitive. In some examples, if a certificate was compromised it would not be usable without the private key on the device itself.

In some examples, authentication service 395 is also used for subsequent device authentication, for issuing a client certificate used for communication with other parties. For instance, in some examples, the client certificate may be used for subsequent authentication with IoT services, to a line-of-business application, or any other public endpoint on the internet. In some examples, the client certificate is a short-term certificate.

In some examples, because the client certificate is short-term, it is not necessary to write the certificate to durable storage, extra steps for revocation are unnecessary, a certificate revocation list is unnecessary, and if the certificates were to be leaked, the time window of exposure would be relatively small.

In some examples, whenever an IoT device communicates with a secure endpoint, a client certificate is required. In some examples, in order to receive a certificate, the IoT device communicates with authentication service 395. In some examples, authentication service is configured respond to request for a certificate from IoT device such as IoT devices 341 and 342, and to provide the IoT device with a short-term certificate upon device and software validation.

One or more of the IoT devices 341 and 342 may include a multi-core processor 345. Each multi-core processor 345 may have a secure boot mechanism using cross-core validation and multiple mutations of a secret device key, with sequentially booting using a chain of trust that corresponds to a defense-in-depth hierarchy of multi-core processor 345, as discussed in greater detail below.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT support service 351, IoT devices 341 and 342, application back-end 313, provisioning service 394, and authentication service 395. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by the IoT support service, which, in some examples, includes one or more IoT support services, such as IoT support service 351. Application back-end 313 includes a device or multiple devices that perform actions in providing a device portal to users of IoT devices.

In some examples, IoT support service 351 may request and/or require an IoT device attempting to connect to IoT support service 351 to remotely attest to the validity of the IoT device and of the software running on the IoT device as part of the connection process, and/or before any further messages, work, or information may be exchanged. Remote attestation may be used to verify that, among other things, at the moment attestation is completed, that the IoT device is a valid, registered device, and the software in the multi-core processor in the IoT device is valid and up-to-date. A device can request a short-term client certificate from authentication service 395. Upon validation, the device receives a short-term certificate. The device may then provide the certificate to IoT support service 351 as evidence that the device and software are valid. In some examples, the issuance of a short-term client certificate combines authentication and attestation into one operation. In some examples, the short-term client certificate acts as a credential that can be used for further services.

System 300 may include more or less devices than illustrated in FIG. 3, which is shown by way of example only.

Illustrative Multi-Core Processor

Figure 4:
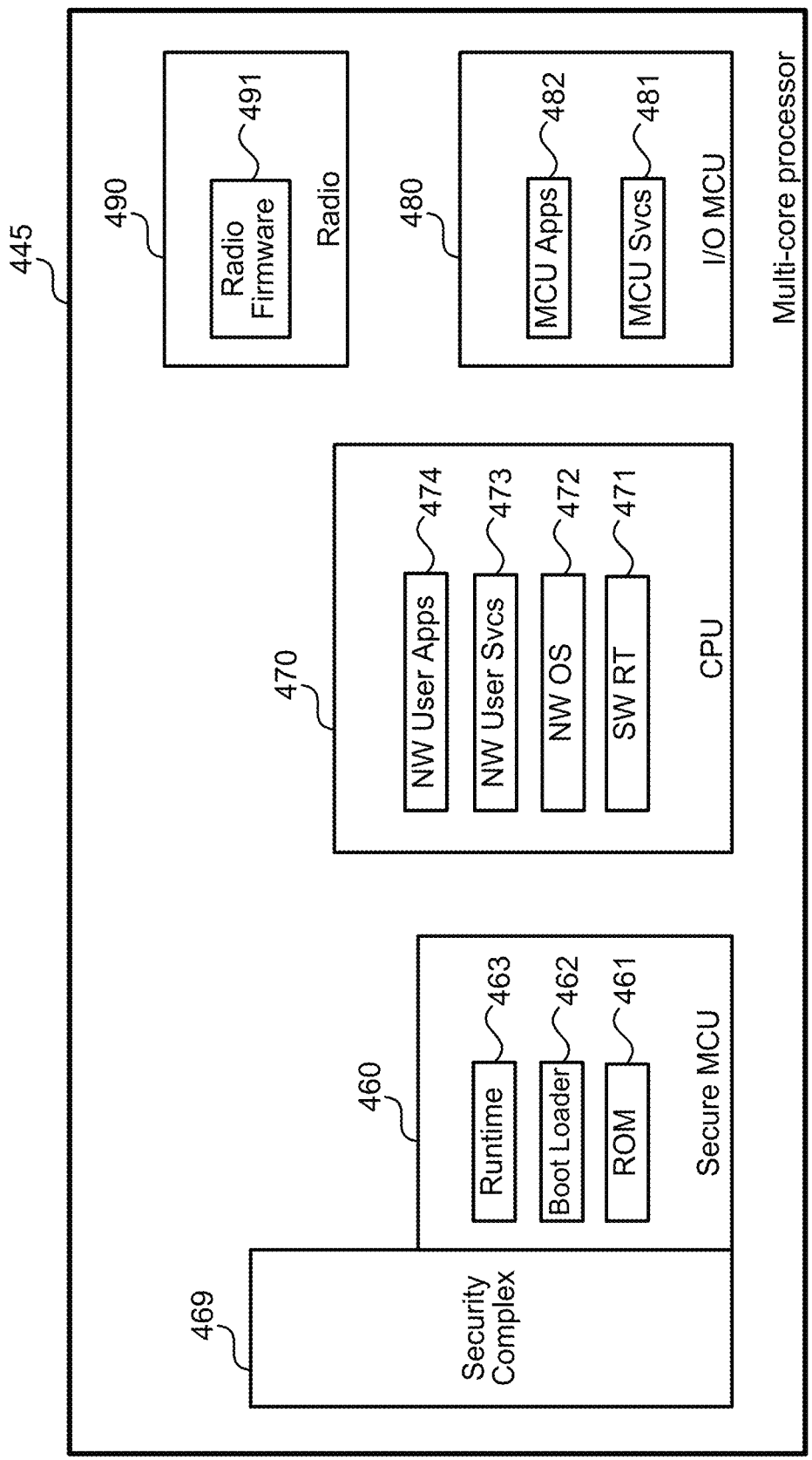
FIG. 4 is a block diagram illustrating an example of the multi-core processor of FIG. 3.

FIG. 4 is a diagram illustrating an example of a multi-core processor 445 with defense-in-depth architecture. FIG. 4 and the corresponding description of FIG. 4 in the specification illustrate an example processor for illustrative purposes that do not limit the scope of the disclosure.

In some examples, multi-core processor 445 enables a device in which multi-core processor 445 is included to operate as an IoT device, such as IoT device 341 or 342 of FIG. 3. In some examples, multi-core processor 445 may have at least 4 MB of RAM and at least 4 MB of flash memory. However, this is merely an example of one possible implementation. Other processors may include various combinations of less, or more, RAM and/or flash memory. In some examples, multi-core processor 445 provides not just network connectivity, but various other functions including hardware and software security, a monitored operating system, cryptographic functions, peripheral control, telemetry, and/or the like. In addition, multi-core processor 445 may include technology for allowing the device to be booted in a secure manner, allowing the device to be securely updated, ensuring that proper software is running on the device, allowing the device to function correctly as an IoT device, and/or the like.

Multi-core processor 445 is arranged as follows in some examples. Multi-core processor 445 includes security complex 469, secure microcontroller (MCU) 460, general purpose CPU 470, at least one input/output (I/O) MCU 480, and radio core 490. Secure MCU 460 may include secure MCU read-only memory (ROM) 461, secure MCU first boot loader 462, and secure MCU runtime 463. CPU 470 may be an application processor that includes Secure World (SW) runtime 471, Normal World operating system (OS) 472 that operates in supervisor mode, Normal World user-mode services 473, and Normal World user-mode applications 474. Each I/O MCU 480 may include MCU services 481 and MCU applications 482. Radio core 490 may include radio firmware 491.

In some examples, security complex 469 is the hardware root of trust in multi-core processor 469. In some examples, security complex 469 is directly connected to secure MCU 460. In some examples, secure MCU 460 has a very high degree of trust, but is less trusted than security complex 469. In these examples, secure MCU 460 controls one or more functions that require a very high degree of trust. In one example, secure MCU 460 controls power for multi-core processor 445 and/or an IoT device.

In some examples, CPU 470 runs a high-level operating system. In some examples, CPU 470 has two independent execution environments: a Secure World (SW) runtime 471 and a Normal World execution environment. The term "Secure World" is used broadly to refer to a trusted environment and is not limited to a particular security feature. In some examples, the Secure World runtime 471 of CPU 470 is also part of the trusted computing base of the system. In some examples, the Secure World runtime 471 of CPU 470 does not, however, have access to the internals of core security complex 469 and relies on secure MCU runtime 463 for particular security-sensitive operations.

The Normal World execution environment of the CPU 470 may be configured to have limited access to such on-chip resources as memories. In some examples, the code running in this environment must still meet certain (e.g., relatively high) standards of security and quality but is less trusted than either the code running on the secure MCU 460 or the code running in Secure World runtime 471 on the CPU 470.

In some examples, the I/O MCU cores 480 are less trusted than the secure MCU 460 and CPU 470, and as such, in some examples the CPU's Secure World environment is responsible for configuring the firewalls of multi-core processor 445 to limit the access of I/O MCU 480 to on-chip resources.

In some examples, radio core 490 executes vendor-provided firmware. The radio core 490 may provide radio functionality and connectivity to the Internet and cloud services such as IoT services. In some examples, radio core 490 may provide communications via Wi-Fi, Bluetooth, and/or other connectivity technology. But as with the I/O MCU 480, in some examples, the CPU 470 is responsible for configuring the firewalls to limit the access of radio core 490 to on-chip resources. In some examples, radio core 490 does not have any access to unencrypted secrets, and is not capable of compromising the execution of secure MCU 460 or the CPU 470.

In some examples, each independent execution environment is managed by a single software component executing in a separate execution environment that is referred to the "parent" of the execution environment. In such examples, one exception may be that the hardware root of trust (security complex 469 in this example) has no parent. In one particular example, each parent executes in an environment that is at least as trusted as the environments it manages. In other examples, other suitable means of security may be employed. Management operations may include booting and resuming the target environment, monitoring and handling resets in the target environment, and configuring access policy for the target environment. In some cases, certain management operations are performed by a component other than a parent. For instance, in some examples, CPU's Normal World is the environment that manages I/O MCU 480, but receives assistance from CPU Secure World runtime 471 to do so (e.g. to configure firewalls, and to program the starting instructions of the I/O MCU 480).

For instance, in some examples, secure MCU runtime 473 manages Secure World runtime 472, a component in Secure World runtime 471 manages Normal World OS 472, a component in Normal World OS 472 manages Normal World user-mode services 473 and applications 474, and Normal World user-mode services 473 manages the I/O MCU 480 and the radio core 490.

In some examples, not only are independent execution environments managed by a software component from a more trusted execution environment, but different functions are assigned to the different independent execution environments, with more sensitive functions assigned to more trusted independent execution environments. In one particular example, independent execution environments less trusted than the independent execution environment to which it is assigned are restricted from having access to the function. In this way, the independent execution environments achieve defense-in-depth based on a hierarchy of trust. In other examples, other suitable means of security may be employed.

For instance, in some examples, security complex 469 is at the top of the hierarchy and is assigned to secrets (e.g., encryption keys), secure MCU runtime 463 is next in the hierarchy and is assigned to controlling power, Secure World runtime 471 is next in the hierarchy and is assigned to storage and to write access to a real time clock (RTC), Normal World OS 472 is next in the hierarchy and is assigned to managing radio functionality, Normal World user-mode applications 474 is next in the hierarchy and is assigned to applications, and the I/O MCU 480 are at the bottom of the hierarchy and are assigned to peripherals. In other examples, functions are assigned to independent execution environments in a different manner.

In some examples, each level of the hierarchy of trust except for the bottom (i.e., least trusted) level of the hierarchy has complete control to accept or reject any requests from a less trusted level, e.g., in terms of implementing support for the software they handle, and have the ability to rate limit or audit the requests from less trusted levels and to validate requests from lower levels to ensure that the requests correct and true. Also, as previously discussed, in some examples, each level of hierarchy except the top (i.e., most trusted) level has a parent that is responsible for managing the lower (i.e., less trusted) level, including monitoring the software of the lower level and ensuring that the software on the lower level is running correctly.

In some examples, the layers of the hierarchy make use of secure communications channels and firewalls. For instance, in some examples, secure MCU runtime 471 has two message queues, configured such that, based on the hardware, one of the queues can only be used in Secure World, and one that can be used from Normal World. In one particular example, if a message comes from the Secure World queue, then based on the hardware the message must have come from the Secure World, and is therefore more trusted than a message that came from Normal World. In other examples, other suitable means of security may be employed.

Additionally, in some examples, apart from the highest layer of the hierarchy, no layer of the hierarchy starts without a higher level of the hierarchy having validated the layer and, after validating the layer, allowed the layer to start. Also, in these examples, a layer of the hierarchy has the ability to stop any lower level of hierarchy, for example, at any time. Accordingly, in these examples, multi-core processor 445 has the software capability of each layer of the hierarchy having complete dominance over lower (i.e., less trusted) levels of the hierarchy in terms of stopping and starting and running of the lower levels of the hierarchy.

In some examples, security complex 469 is the hardware root of trust and the highest, most trusted level of the defense-in-depth trust hierarchy. In some examples, security complex 469 contains keys, secrets, encryption engines, and/or the like. In some examples, security complex 469 stores secrets, performs functions such as key generation, encryption, decryption, hashing, other cryptographic functions, other security-related functions, and/or the like. In some examples, security complex 469 is able to check the secret value stored in a one-way writable memory such as an e-fuse, one time programmable element, and/or the like.

In some examples, when multi-core processor 445 is powered on and its power management unit (PMU) has stable power, the PMU releases the security complex 469 from reset. In some examples, the security complex 469 is at the core of multi-core processor 445's trusted computing base. In some examples, core security complex 469 drives the secure boot process. In one particular example, cores are restricted from executing code until the security complex 469 has enabled it to do so. In other examples, other suitable means of security may be employed.

In some examples, execute in place (XiP) is not used on the secure MCU 460, in order to avoid the possibility of undetected runtime writes to flash resulting in untrusted code executing on secure MCU 460. In one particular example, the ROM 461 and runtime 463 instead ensure that code executing on secure MCU 460 is copied into the private SRAM of secure MCU 460 from flash and validated before executing. In other examples, other suitable means of security may be employed.

In some examples, the secure MCU 460 does not contain a memory management unit (MMU), but does contain a memory protection unit (MPU) that can be used to provide some safeguards—such as controlling the readability, writability, and executability of portions of the physical address space. The MPU may be used in this fashion, e.g. marking stacks and memory-mapped flash as no-execute.

In some examples, secure MCU ROM 461 is responsible for initializing enough of multi-core processor 445 so that the first piece of software stored in flash can securely execute on the secure MCU 460.

In some examples, upon entry, the code in secure MCU ROM 461 waits for indication that the secure MCU 460 has completed initialization, reads the e-fuse indicating the device's security state, configures Phase Locked Loops (PLLs) to set the desired steady-state, clock frequency, and enables memory mapping of flash (e.g., for all cores). In some examples, although the secure MCU 460 does not execute code directly from flash, it does leverage this mechanism to read and copy data from flash to its SRAM.

In these examples, after it has completed this configuration, the code in ROM 461 is responsible for loading and transferring control to secure MCU boot loader 462, which is the first-level boot loader of secure MCU 460. In some examples, secure MCU boot loader 462 is found in flash, both encrypted and signed, at known locations. In these examples, the ROM code validates the code, and loads it into the private SRAM of secure MCU 460. In some examples, secure MCU boot loader 462 contains the first instruction of non-ROM code executed on Multi-core processor 445, and is a fixed size (e.g., 16 k) raw binary. In some examples, secure MCU boot loader 462 is responsible for loading, validating, and transferring control to the secure MCU Runtime 463, setting up the device's software key store, implementing a low-level "recovery mode" for re-programming flash (used for development purposes, and possibly also for in-the-field updates-appropriately secured), applying updates/rollbacks, and configuring and kicking a secure watchdog timer in secure MCU 460 (until the secure MCU runtime 463 takes control).

Much like the ROM code before it, in these examples, secure MCU boot loader 462 locates the secure MCU runtime code in flash, validates the code, loads the code into the private SRAM of secure MCU 460, and transfers control to the code. In some examples, once secure MCU boot loader 462 has transferred execution in this way, secure MCU boot loader 462 will not regain control, and secure MCU boot loader 462 will not remain resident in the SRAM of secure MCU 460 after secure MCU boot loader 462 has finished executing.

In some examples, secure MCU runtime 463 is responsible for managing the CPU's Secure World environment. In some examples, secure MCU is also responsible for managing and controlling power domains and other critical components, e.g., properly setting up debug enabling signals for other cores, powering on or off different domains on multi-core processor 445, re-configuring and kicking the own watchdog timer of secure MCU 460 (taking over for secure MCU boot loader), configuring the watchdog timer of CPU 470 and responding to its reset interrupt, and waking up a core (CPU 470 or I/O MCU 480) that has been powered off but received an interrupt. In some examples, secure MCU runtime 463 is responsible for monitoring Secure World runtime 471 of the CPU 470 to ensure that Secure World runtime 471 is running correctly and to reset Secure World runtime 471.

Secure MCU runtime 463 interacts with security complex 469 to request that core security complex 469 perform tasks associated with core security complex 469. For instance, secure MCU runtime 463 may request security complex 469 to extract keys, or to request that security complex 469 do something with the extracted keys, to request that security complex 469 generate a pin number, to request that something be encrypted by security complex 469 and the encrypted version returned to secure MCU runtime 463, and/or the like. In some examples, secure MCU runtime 463 acts in essence as the operating system for security complex 469.

Secure World on the CPU 470 may have a trust zone that creates a private independent execution environment that is hardware-protected from the rest of multi-core processor 445. Secure World may have a runtime, Secure World runtime 471. In some examples, the Secure World environment on the CPU 470 is part of multi-core processor 445's trusted computing base, and as such does not execute third-party code. For example, Secure World may have its own kernel and user mode processes. Secure World runtime 471 may be responsible for protecting security-sensitive hardware resources on multi-core processor 445, safely exposing limited access to these resources, and acting as a watchdog for the CPU 470's Normal World environment of Normal World OS 472, Normal World user services 473, and Normal World applications 474. For instance, in some examples, Secure World runtime 471 is responsible for monitoring Normal World OS 472, ensuring the Normal World OS 472 is running correctly, and resetting Normal World OS 472. In some examples, Secure World runtime 471 is responsible for forwarding requests to secure MCU 463 runtime from layers that do not have access to secure-MCU 463 runtime.

In some examples, the CPU 470 does not contain ROM code; instead, CPU 470 contains an 8-byte volatile memory that contains the first instruction(s) for it to execute upon being taken out of reset. In these examples, before the CPU 470 is taken out of reset, the 8-byte volatile memory is programmed by the secure MCU 460 to contain a branch to the first instruction of the CPU Secure World runtime 471, executing from shared SRAM. In some examples, CPU 470 is configured such that the code that executes in Secure World runtime 471 executes from a range of SRAM that is configured to be inaccessible to Normal World 472-474.

In some examples, Secure World runtime 471 is also responsible for booting Normal World environment on the CPU 470, exposing runtime services to software running in Normal World, access to real-time clock (RTC), I/O MCU 480 management API, radio core 490 management API, managing silicon components not accessible to Normal World (and which do not need to be managed by the secure MCU 460), interacting with the flash controller in macro mode, programming a direct memory access (DMA) engine of CPU Secure World 471, configuration of all firewalls, configuration of the core I/O mapping, handling interrupts indicating firewall violations, taking I/O MCU 480 and radio 490 cores out of reset, configuring watchdog timers for I/O MCU 480 cores, configuring the Real-time clock (RTC), and managing updates for certain software components. Because Secure World also contains multiple hardware modes (i.e. supervisor mode, user mode), the Secure World runtime 471 may internally span multiple modes for additional defense-in-depth.

In some examples, Secure World runtime 471 operates below secure-MCU runtime 463 in the trust/defense-in-depth hierarchy, but above Normal World OS 472 in the hierarchy. In these examples, whereas secure-MCU runtime 463 can, for instance, request that core security complex 469 generate a pin number, Secure World runtime 471 cannot. Also, in these examples, whereas secure-MCU runtime 463 has access to power, Secure World runtime 471 does not. However, in these examples, Secure World runtime 471 is in charge of managing storage, and layers of the hierarchy below Secure World runtime 471 do not have access to storage.

As discussed, in some examples, the Secure World environment of CPU 470 is a hardware-protected private execution environment of CPU 470. The rest of the software environment of CPU 470, other than the Secure World environment, is the Normal World environment. There are registers that the Secure World can read but the Normal World cannot in some examples. The Normal World environment may include a supervisor mode and a user mode. The supervisor mode of the Normal World environment of CPU 470 may include Normal World OS 472. The user mode of the Normal World environment of CPU 470 may include Normal World user services 473 and Normal World user applications 474.

In some examples, Normal World OS 472 is responsible for managing the resources for Normal World user applications 474. In some examples, Normal World OS 472 is responsible for managing radio functionality, and layers hierarchically below (i.e., less trusted than) Normal World OS 472 do not have direct access to radio functionality, but instead access radio functionality indirectly via Normal World OS 472.

In some examples, in CPU Normal World user-space, a set of user services 473 are run that are responsible for: booting I/O MCU 480 (with assistance from Secure World runtime 471), booting the radio core 490 (with assistance from Secure World runtime 471), publishing device telemetry to IoT services, publishing diagnostic information to IoT services, receiving and applying software updates from IoT services, and handling reset interrupts from I/O MCU 480 watchdog timers.

In some examples, the CPU Device API internally leverages Normal World user Runtime Services 473, and abstractly provides third-party application Code hosted on the CPU (in Normal World) with access to the following functionality: publishing device telemetry, publishing diagnostic information, communicating with I/O MCU 480, controlling and issuing I/O to peripheral, and application Code. In some examples, product manufacturers and other customers of multi-core processor 445 may author third-party code to execute on the CPU 470 in Normal World. In some examples, the code is able to use the CPU Device API, and may coordinate with I/O runtimes executing on I/O MCU 480.

In some examples, multi-core processor 445 contains two "I/O" MCUs 480 intended for sensing and actuation. In some of these examples, neither I/O MCU 480 contains any ROM code. Instead, in these examples, each I/O MCU 480 contains an 8-byte volatile memory mapped at a particular physical address. When an I/O MCU 480 starts executing, it may fetch its initial instructions from this address. Before each I/O MCU 480 is taken out of reset, the 8-byte volatile memory may be programmed by the CPU 470 to contain a branch to the first instruction of an I/O MCU Loader, XiP from flash.

In some examples, a company can use the I/O MCU 480 microcontrollers to include the code that is on their existing microcontrollers, which may allow a company to replace their existing microcontroller functionality with multi-core processor 445.

In some examples, multi-core processor 445's radio stack executes on radio core 490 programmed by the silicon vendor producing the chip.

While FIG. 4 illustrates a particular example of multi-core processor 445, many other examples of multi-core processor 445 are possible. For instance, the number and type of independent execution environments may vary in different examples. In some examples, multi-core processor 445 has at least two general purpose cores with differing capabilities, so that multi-core processor 445 has heterogeneous cores. The at least two general purpose cores with differing capabilities may be at least a microcontroller and a CPU in one example, while other general purpose cores with different capabilities are used in other examples. The two cores are general purpose in that any suitable code can be run on the cores. For example, the MCU microcontroller and the CPU are general purpose cores, whereas a graphic processing unit (GPU) is not a general-purpose core; rather, a GPU is used to process specific types of calculations, and can runs certain types of executions. While the two cores in multi-core processor 445 are both general purpose and each can run any suitable code, they have differing capabilities from each other. Although the CPU and the MCU microcontroller are both general-purpose cores, the CPU is generally more powerful than the MCU and can execute instructions that the MCU microcontroller cannot. This is but one example of two general purpose cores with differing capabilities. While specific cores are discussed herein, such as the CPU and the MCU, in other examples, other general purpose cores may be employed such as any general purpose CPU, microcontroller, or the like. Also, various quantities of cores may be employed in various examples.

Also, in various examples, different functions may be assigned to different levels of the hierarchy. For instance, in the example of multi-core processor 445 illustrated in FIG. 4, the function of controlling power is assigned to a more trusted level of the hierarchy than the function of managing storage. However, in other examples, the function of managing storage is assigned to a more trusted level of the hierarchy than the function of controlling power.

Multi-core processor 445 may use a secure key store to store keys and other secrets. For examples, some of the keys in the secure key store may be used for validating signatures to software, e.g., to ensure that the software is genuine and valid.

In some examples, when multi-core processor 445 is powered on and its PMU has stable power, the PMU releases the security complex 469 from reset. In some examples, secure MCU ROM 461 is responsible for initializing enough of multi-core processor 445 so that the first piece of software stored in flash can securely execute on the secure MCU 460. In some examples, the ROM code on secure MCU ROM 461 waits for indication that the secure MCU 460 has completed initialization, reads the e-fuse indicating the device's security state, configures PLLs to set a clock frequency, and enables memory mapping of flash (e.g., for all cores).

In these examples, after it has completed this configuration, the code in MCU ROM 461 is responsible for loading and transferring control to secure MCU boot loader 462, which is the first-level boot loader of secure MCU 460. In some examples, the first boot loader is stored in flash. In some examples, the first boot loader is encrypted and signed with a global private key that is part of a public/private key pair. In some examples, the code in MCU ROM 461 reads the first boot loader. In some examples, the ROM code in MCU ROM 461 calculates a hash of the first boot loader and verifies the first boot loader with a global public key. In some examples, in response to verification, the code in MCU ROM 461 causes the first boot loader to be loaded into the private SRAM of secure MCU ROM 460 and booted.

In some examples, the validation of the signature of the first boot loader provides assurance that the first boot loader is genuine and/or valid. Although the first boot loader may be signed with the global private key, for a number of reasons, including exposure risk, it is not necessarily desirable for all software to be signed with the global private key. Further, some devices are designed such that the first boot loader should not be altered during the device lifetime. However, other software may be designed to be updated, e.g., in the field, after deployment, etc., and the updating of this other software may be associated with a new signature for such updated software. Accordingly, instead of using the global private key to sign all software, a number of different keys may be used. However, in some examples, secure MCU ROM 461 stores the global public key, but does not store all of the additional keys that would be needed to validate the software.

Accordingly, a secure key store may be used to secure the other keys used for validation of signatures of software. In some examples, the secure key store is on flash memory. In some examples, the secure key store is encrypted and/or signed with a mutated key that may be derived as follows.

In some examples, each multi-core processor 445 has a secret, unique, per-device key. In some examples, the per-device key is an Advanced Encryption Standard (AES) key that is stored in hardware. In some examples, the per-device key can be used in particular authorized ways, including to generate a mutation of the per-device key, but software may be disallowed from reading the per-device key itself, e.g., because the hardware that stores the per-device key does not allow software to read the per-device key. Instead the hardware may allow the particular authorized actions to be performed. In some examples, after booting the first boot loader, secure MCU ROM 460 mutates the per-device key based on the hash of the first boot loader to derive a first mutated key. Secure MCU ROM 460 may cause the first mutated key to be stored in the private SRAM of secure MCU ROM 460. Mutating a key may interchangeably be referred to as key derivation or performing a key derivation function. The first mutated key may be deterministic because it is generated from the first boot loader, which, in some examples, does not change during the lifetime of multi-core processor 445.

Next, in some examples, the first bootloader is booted.

The first bootloader may generate a second mutated key based on the first mutated key and a random seed. The second mutated key may be used for the encryption, decryption, signing, and/or validation of the secure key store.

On an initial/first boot of a device, keys, hashes, and other secrets may be determined and stored in the secure key store flash memory, and encrypted and/or signed with the second mutated key. Among other things, the keys used for validation the software stages that boot after the secure MCU runtime may be stored in the secure key store. Accordingly, on initial boot, the secure key store may be created on flash memory and encrypted and/or signed with the second mutated key. In some examples, as discussed above, the random seed is used to derive the second mutated key on the initial boot, and the random seed is stored and is not secret. Accordingly, in some examples, on subsequent boots, the flash memory contains a secure key store that can be decrypted and/or validated with the second mutated key. Also, in some examples, on subsequent boots, the same second mutated key should be generated as the initial boot, because the per-device key should be the same as the initial boot and the hash of the first boot loader should be the same as the initial boot, and the same random seed is used.

In addition to generating the second mutated key as discussed above, the first bootloader may generate one or more additional mutated keys from the first key and a separate corresponding persistent and validated random number. Next, in some examples, the first boot loader locates the secure MCU runtime 463 code in flash, reads the secure MCU runtime 463 code, and calculates a hash of the secure MCU runtime 463 code. In some examples, secure MCU runtime 463 calculates a hash of Secure World runtime 471. In some examples, the first boot loader encrypts and/or signs (using the second mutated key) and stores in flash memory the hash of the secure MCU runtime 463 code in the secure key store in flash memory. In some examples, the first bootloader than finishes execution. The first mutated key is not available after the first bootloader finishes execution until multi-core processor 445 reboots.

In some examples, the Secure World runtime 471 encrypts and/or signs (using the second mutated key) and stores in flash memory the hash of the Normal World OS in the secure key store flash memory.

In some examples, the Normal World OS 472 encrypts and/or signs (using the second mutated key) and stores in flash memory the hash of Normal World user applications 474 from the secure key store in flash memory.

In some examples, the hash calculation and signing of the current software stage continues for the remaining stages in a similar manner.

On subsequent boots, as previously discussed, in some examples, the second mutated key is regenerated and used to decrypt the secure key store. In some examples, after the second mutated key is regenerated, the first boot loader locates the secure MCU runtime 463 code in flash, reads the secure MCU runtime 463 code, and calculates a hash of the secure MCU runtime 463 code.

In some examples, on subsequent boots after the first boot loader has calculated the hash of the secure MCU runtime 463 code, the first boot loader reads from the secure key store in flash memory and decrypts and/or validates the hash of the secure MCU runtime 463 code stored in the secure key storage. In some examples, the first boot loader then validates secure MCU runtime 463. The validation may include comparing the hash of the MCU runtime 463 code calculated during this boot with the stored hash of the secure MCU runtime 463 code, and using a public key for the secure MCU runtime 463 to validate the signature of the secure MCU runtime 463. In some examples, the public key for the secure MCU runtime 463 is stored in hardware, and the public key for subsequent software stages are stored in the secure key store. In some examples, in response to validation of the secure MCU runtime 463, the first boot loader loads the secure MCU runtime 463 into private SRAM and transfers control to the secure MCU runtime 463 code, causing the secure MCU runtime 463 to be booted.

In some examples, each subsequent stage boots sequentially in a similar manner, with each stage being sequentially validated and booted by its parent in the trust hierarchy. For example, the MCU runtime 463 may be responsible for validating and booting the Secure World runtime 471, the Secure World runtime 471 may be responsible for validating and booting the Normal World OS 472, the Normal World OS 472 may be responsible for validating and booting the Normal World user applications 474, and the Normal World user applications 474 may be responsible for validating one or more I/O MCUs 480.

For instance, in some examples, secure MCU runtime 463 calculates a hash of Secure World runtime 471. In some examples, the secure MCU runtime 463 reads from the secure key store in flash memory and decrypts and/or validates the public Secure World runtime public key and the hash of the Secure World runtime 471 code. The secure MCU runtime 463 may then validate Secure World runtime 471. The validation may include comparing the hash of the Secure World runtime 471 calculated during this boot with the stored hash of the Secure World runtime 471 code, and using the secure MCU runtime public key to validate the signature of the Secure World runtime 471. In some examples, in response to validation of the Secure World runtime 471, the secure MCU runtime 463 loads the Secure World runtime 471 into private SRAM and causes the Secure World runtime 471 to be booted.

In some examples, the Secure World runtime 471 reads from the secure key store in flash memory and decrypts and/or validates the Normal World OS public key and the hash of the Normal World OS 472 code. In some examples, the Secure World runtime 471 then validates Normal World OS 472. The validation may include comparing the hash of the Normal World OS 472 calculated during this boot with the stored hash of the Normal World OS 472 code, and using the Normal World OS public key to validate the signature of the Normal World OS 472. In some examples, in response to validation of the Normal World OS 472, the Secure World runtime 471 loads the Normal World OS 472 into SRAM for the Secure World of CPU 470 and causes the Normal World OS 472 to be booted.

In some examples, the sequential validation and booting continues for the remaining stages to be booted in a similar manner, with each stage being sequentially validated and booted by its parent in the trust hierarchy, and with the mutated key being read from the secure key store and then decrypted and/or validated with the second mutated key.

During any of the validation stages, validation may possibly fail because the software is not genuine, because the software was corrupted, because an attacker is trying to break into the device, and/or the like. In some examples, if validation fails at any stage, then neither that stage nor any subsequent stages are booted, and any keys, hashes, and/or secrets in memory (SRAM) are erased. Use of the first mutated key may also be restricted, e.g., to use for generation of other key(s). In this example, once the other key(s) are generated, the first mutated key may be erased, e.g., by a clearing of the register in which it is stored.

In some examples, a device may be designed such that the secure MCU 460 ROM code and the first bootloader are not intended to be updated. Other software/stages however, may be updated one or more times during the device lifetime, and some may be updated frequently. In some examples, during an update, prior to the update itself, the Secure World first verifies the pending update, and hashes the updated code. In some examples, the secure MCU runtime 463 then updates, in the flash memory, the hashes and keys for any stage that are to be updated, and generates a signature for any updated stages.

In some examples, the secure key store may also be used to store other secrets, including user-provided secrets such as network credentials, or other information to be protected from potential attackers. In some examples, these additional secrets may be stored on the secure key store in flash memory may also be encrypted and/or signed with the second mutated key.

After boot is complete, multi-core processor 445 may communicate over a network for IoT services, for example, via communication with an IoT support service such as IoT support service 351 of FIG. 3. In some examples, IoT support service 351 may request and/or require the IoT device containing multi-core processor 445 to remotely attest to the validity of the IoT device and of the software running on the IoT device or multi-core processor 445 as part of the connection process, and/or before any further messages, work, or information may be exchanged. Remote attestation may be used to verify that the IoT device is valid and that software in the IoT device/executing on the multi-core processor is valid, resulting in the issuance of a short-term client certificate that enables authentication to other services. As one example, IoT support service 351 may require a valid client certificate in response to a connection request, a request for IoT services, or other communication from the IoT device.

In some examples, hardware in secure MCU 460 makes an authentication request including a one-time cryptographic nonce sent from the certifying authority, a set of measurements associated with the IoT device that indicates the versions of the software running on the IoT device, and a signature generated from a private attestation key stored in hardware in secure MCU 460. The measurements are discussed in greater detail below, and may include, among other things, the values of two registers in secure MCU 460 that may be referred as DR0 and DR1 in some examples.

In some examples, the private attestation key is stored in hardware by secure MCU 460 and access is restricted to secure MCU 460. In some examples, the private attestation key is part of a public/private key pair, and IoT support service 351 has the public attestation key that corresponds to the private attestation key.

In some examples, register DR1 is a fully readable and writable register. In some examples, register DR0 is an accumulation register. In some examples, the value of DR0 is readable and is not secret. In some examples, the value of DR0 is reset to zero (or some other default value) on device reboot. In some examples, modification of the value of the DR0 register is limited to operations that cryptographically append a value to the DR0 register.

In some examples, during the secure boot of multi-core processor 445, as previously discussed, various stages are sequentially booted, with each stage being validated and booted by its parent in the trust hierarchy. For instance, in some examples, as discussed above, secure ROM 461 is responsible for booting the first boot loader, the first boot loader is responsible for booting the MCU runtime 463, the MCU runtime 463 may be responsible for next booting the Secure World runtime 471, the Secure World runtime 471 may be responsible for next booting the Normal World OS 472, the Normal World OS 472 may be responsible for next booting the Normal World user applications 474, and the Normal World user applications 474 may be responsible for next booting one or more I/O MCUs 480.

As discussed above, prior to or in conjunction with booting each software stage, a hash may be taken of that software stage. For example, a hash may be generated of the first boot loader prior to, or in conjunction with, booting the first boot loader, a hash of the MCU runtime 463 may be generated prior to, or in conjunction with, booting the MCU runtime 463, a hash of the Secure World runtime 471 may be generated prior to, or in conjunction with, booting the Secure World runtime 471, a hash of the Normal World OS 472 may be generated prior to, or in conjunction with, booting the Normal World OS 472, and so on. Hashes may also be generated for the subsequent software stages that are booted during the secure boot process. In some examples, as a hash is generated for each software stage, the hash of that software stage is cryptographically appended to accumulation register DR0.

Multi-core processor 445 may require a client certificate in order to communicate with IoT services and other services. In some examples, the client certificate is an X.509 v3 certificate that is issued with a relatively short life, such as 24 hours or similar suitable time period. In some examples, the life chosen for the certificate is a tradeoff between security on the one hand and on the load on the authentication service on the other hand. In some examples, the life chosen for the certificate is a suitable period of time that is less than forty-eight hours. In some examples, the device seeks a new client certificate whenever the device's current client certificate is near expiration. In some examples, obtaining a client certificate requires certain measurements to be performed on the device. In some examples, the device's attestation hardware tracks two registers—DR0 and DR1. In some examples, both are initialized to a value of 0 when the device is reset. In some examples, the DR0 value can only be reset to 0 via a chip reset. This property may prevent malicious software from tampering with or forging an attestation signature.

The hardware may provide an operation, DR0_Append, that can be used to modify the value of DR0 by taking an input, appending it to DR0, then hashing the resulting value and taking as the new DR0 value. This may enable software to keep adding measurement data to the DR0 register in a way that isn't reversible but is still verifiable by repeating the steps on the service side.

In some examples, as the device boots, each stage makes a series of measurements that are added to the measurement list, a structure that is held in security complex MCU memory. In some examples, each value added to the measurement list is appended to DR0 to produce a final DR0 value. In some examples, any changes to the software in the measurement list requires a full chip reset so that DR0 can be recomputed with the new value, because running the new software without a chip reset would make the attestation incorrect and open a security vulnerability.

In some examples, the following items are measured on boot as shown in Table 1:

TABLE 1

| Item | Measurement Value | Notes |
| --- | --- | --- |
| SoC Hardware Chip ID | Chip ID register | Identifies device type |
| SoC Hardware Chip Revision | Chip revision register | Identifies version of SoC |
| Security Complex revision ID | Revision bits from Security Complex | Identifies version of Security Complex |
| Boot Source | Primary Flash, Secondary Flash, Recovery | Identifies the source the SoC booted from, enables prevention of recovery boots from authorization |
| Bootloader signing public key | Hash of key | Identifies bootloader signing key |
| Bootloader software | SHA256 hash of binary | Measured by ROM |
| Secure MCU Runtime software | SHA256 hash of binary | Measured by bootloader |
| Debug enabled | True or false | Measured by Secure MCU runtime |
| Secure World software | SHA256 hash of binary | Measured by Secure MCU runtime |
| Normal World Loader software | SHA256 hash of binary | Measured by Secure World |
| Normal World OS kernel | SHA256 hash of binary | Measured by Secure World |
| Normal World OS file system | SHA256 hash of binary | Measured by Secure World |

The device measurements are used as part of examples of the device authentication process. Examples of the device authentication process are discussed in greater detail below with regard to FIGS. 5-8.

A specific example of a list of device measurements is given above. In other examples, other device measurements may be employed. In some examples, the device measurements include measurements of the versions of the software that the device is running.

FIG. 4 illustrates one specific example of a multi-core processor for which remote attestation may be employed, by way of example. Remote attestation may also be employed for other examples of multi-core processors. FIG. 4 illustrates an example that includes a secure MCU with the hardware root of trust, a CPU executing a Secure World environment and a Normal World environment, and other MCUs with a lower level of trust. In this example, the secure MCU is the first core that is booted, followed by a CPU (with the Secure World execution environment booting before the Normal World execution environment boots), followed by the other MCUs. Other examples may include other cores and/or other trust hierarchies than the specific example of FIG. 4, which is given by way of example only.

In some examples, multi-core processor 445 includes at least two cores including at least a first general purpose core and a second general purpose core in which the first and second general purpose cores have different capabilities, and which boot sequentially according to a chain of trust that corresponds to a hierarchy of trust in which one of the general purpose cores is more trusted than the other general purpose core, with the more trusted general purpose core being validated and booted before and the less trusted general purpose core. The cores need not correspond to the particular cores illustrated in FIG. 4, which is but one example.

Although a specific examples of multi-core devices is discussed herein with regard to FIG. 3 and FIG. 4, examples of the disclosure are not limited to multi-core devices. The authentication method described herein may be also be used by any suitable IoT device, network device, or computing device that is capable of properly communicating with an authentication service or authentication device.

The certificate may be used to authenticate that the device is a known device that was previously registered during device provisioning, with the identity of the device being proven though a cryptographic exchange, and the certificate also attests the versions of software that were running on the device at the time of attestation. In this way, if it is determined that a device is running a compromised version of software, the device may be unable to communicate with certain services until the software is updated.

Additionally, in some examples, because there is no centralized dependency to the client certificates, the process will scale linearly.

Figure 5:
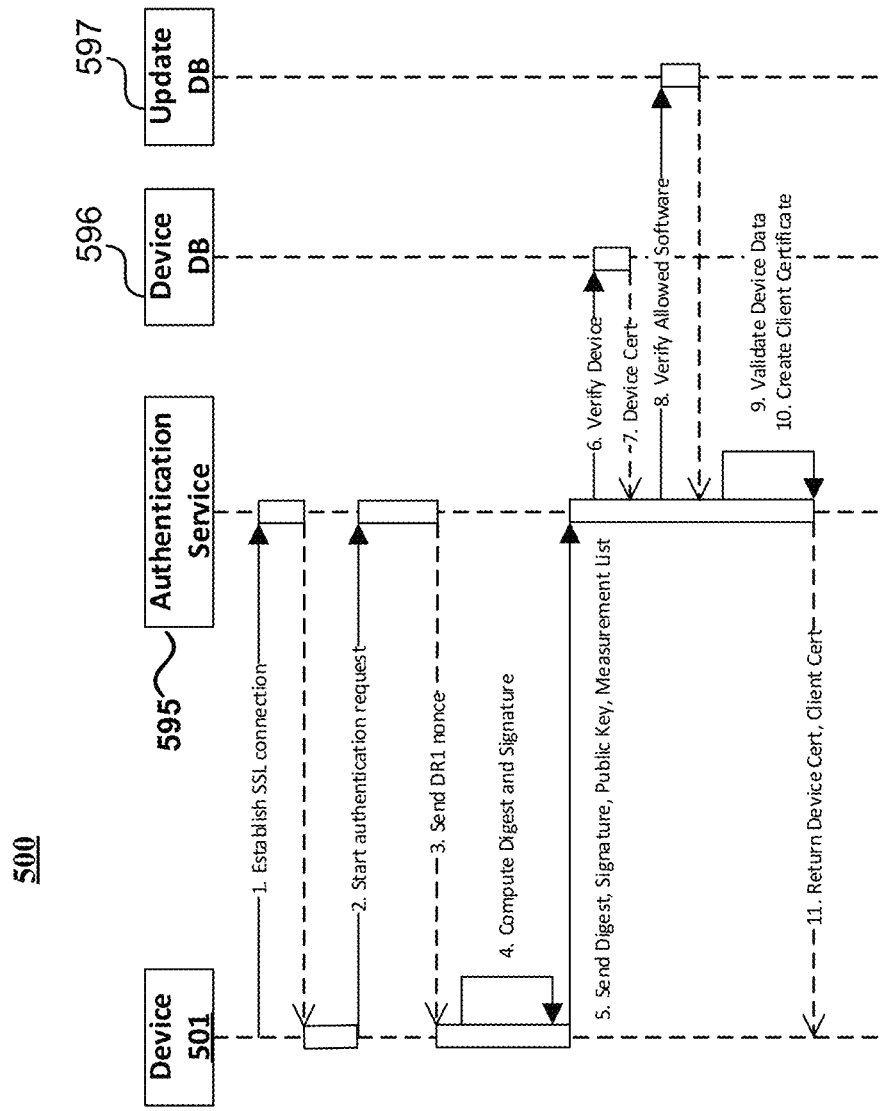
FIG. 5 is an example dataflow for a process for online authentication.
Figure 6:
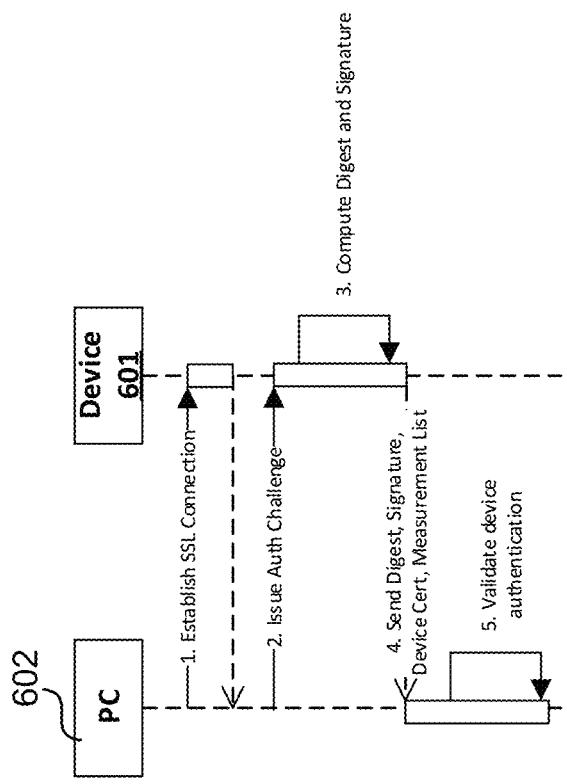
FIG. 6 is an example dataflow for a process for offline authentication.
Figure 7:
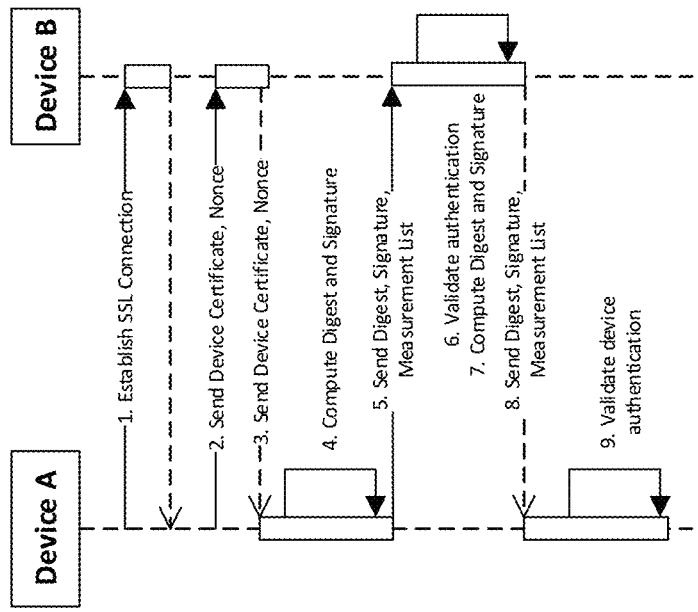
FIG. 7 is an example dataflow for another process for offline authentication.

The devices illustrated in FIGS. 5-7 may be IoT devices with multi-core processors in some example, but in other examples, may be virtually any suitable IoT device, network device, or computing device.

FIG. 5 is a diagram illustrating a dataflow for a system (500) that may be employed as an example of system 300 of FIG. 3. In some examples, system 500 includes device 501, authentication service 595, device database (DB) 596, and update database (DB) 597. Device 501 may be example of device 200 of FIG. 2 in some examples.

In the illustrated example, first, step 1 occurs. At step 1, in some examples, as a start of the authentication request, device 501 establishes an SSL connection with authentication service 595. In some examples, the server is authenticated and device 501 validates that its SSL certificate is valid and trusted by validating the certificate's certificate authority (CA) signing chain.

At step 2, in some examples, once device 501 has validated the connection, device 501 sends a HTTPS request to start authentication.

At step 3, in some examples, authentication service 595 generates a cryptographically strong nonce to supply to device 501. In some examples, this nonce is specific to each request and ensures that replay attacks are not possible. In some examples, this value is sent to device 501.

At step 4, in some examples, device 501 takes the nonce and stores it in the DR1 register of device 501. In some examples, device 501 then computes the final digest by executing the DR_Sign_ECC Security Complex operation. In some examples, this operation is implemented in hardware to prevent tampering. In some examples, this operation concatenates DR0 and DR1 then SHA256 hashes the value and signs it with the attestation key.

At step 5, in some examples, device 501 sends this digest and signature, its public key, and the measurement list that device 501 used to authentication service 595 for validation.

At step 6, in some examples, authentication service 595 receives the data and then does a series of validation steps. In some examples, authentication service 595 starts the series of validation steps by looking up the public key in device DB 596 and validating that device 501 is a known device. In some examples, if authentication service 595 does not find a record, the authentication fails.

At step 7, in some examples, device database 597 returns the previously generated device certificate that was created for device 501 as part of device provisioning. In some examples, the certificate is validated and it is verified that it is issued by a common device certificate authority (CA) chain.

At step 8, in some examples, authentication service 595 determines that the list of software is complete and ordered correctly. In some examples, authentication service 595 then asks update DB 597 for the list of software that is allowed to run on device 501. In some examples, the list that is allowed to run on device 501 not only includes the current software release assigned to device 501 but also previous versions that are still trusted from a security perspective. In some examples, each item in the measurement list is checked to be in the allowed list. In some examples, if any one piece of software in the measurement list is not in the allowed list, the authentication fails and a result is sent from authentication service 595 to device 501 asking device 501 to update before device 501 continues.

At step 9, in some examples, authentication service 595 computes the correct DR0 value for the measurement list by repeating the steps that the security complex hardware of device 501 does. In some examples, authentication service 595 then mixes in the DR1 nonce that authentication service 595 generated earlier and verifies the final transmitted digest value. In some examples, if the digest doesn't match the measurement list, then the measurement list is invalid and the authentication fails. In some examples, if it does match, then authentication service 595 checks the signature against the public key of device 501 to prove that device 501 is the holder of the private key.

At step 10, in some examples, at this point device 501 has proven its identity and the software that device 501 is running has been validated by authentication service 595. In some examples, authentication service 595 then generates a new client certificate for use by device 501 with other services. In some examples, this certificate is marked to expire in a short period of time (for example, 1 day) to force regular authentication check-ins by device 501. In some examples, as part of the certificate, the measurement list is encoded so that future services can see what software was used for attestation.

In some examples, even though this certificate has an expiration date, a real time clock is not needed on device 501 to enforce security. In some examples, the validity and expiration date are verified by each service, which is expected to have an accurate clock.

At step 11, in some examples, authentication service 595 then sends the device certificate and client certificate to device 501. In some examples, device 501 stores both certificates in secure data storage. In some examples, device 501 is now authenticated and ready to talk to other services.

In some examples, when device 501 wants to communicate with another service, it uses standard TLS protocols to authenticate via the client certificate.

In some examples, when device 501 receives the certificate, device 501 looks at the expiration date and sets up logic to proactively renew the certificate when the expiration date is near.

In some examples, when an authentication fails, device 501 is sent one of two failure states: "generic error" or "update required." In some examples, with "generic error," device 501 is expected to retry. In some examples, it is expected that most validation and service errors would be mapped to this to prevent information disclosure.

In some examples, with "update required," this means that there is a software version that is untrusted and requires updating in order to be trusted. In some examples, authentication service 595 would send this whenever the measurement list contains software that is not trusted. In some examples, with update required, authentication service 595 sends device 501 a quarantine certificate. In some examples, the quarantine certificate includes an indication that device 501 is running untrusted software. In some examples, the update service will communicate with a device having the quarantine certificate, so that device 501 can be updated, while other services such as a line-of-business application may disallow communication until device 501 is properly updated.

In some examples, a quarantine certificate may also be issued for other reasons. In some examples, the device measurement may include an indication as to whether hardware debugging is enabled on device 501. In some examples, a quarantine certificate is issued if hardware debugging is enabled on device 501. In some examples, a quarantine certificate may be issued if device 501 is running obsolete hardware, for example, if the hardware is out-of-date or contains a physical security defect.

In some examples, as part of the device's boot measurement, device 501 can confirm that device 501 is running a known bootloader, and that bootloader can issue a measurement indicating that device 501 is authorized to run test software. In some examples, when authentication service 595 sees the indication that device 501 is allowed to run test software, device 501 skips the rest of the validation.

If device 501 receives a quarantine certificate, device 501 may proactively start the update process to resolve the issue, for example, by communicating with an update service and requesting to be updated to the latest software.

FIG. 6 is a diagram illustrating a dataflow for a system (600) that may be employed as an example of system 300 of FIG. 3. In some examples, system 700 includes personal computer (PC) 602 and device 601. PC 602 and device 601 may be examples of device 200 of FIG. 2 in some examples.

FIG. 6 and FIG. 7 illustrate two known authentication scenarios that don't involve authentication via a cloud service and thus can run without active internet connectivity. In the specific examples illustrated in FIG. 6 and FIG. 7, the device certificate is installed on the device to be authenticated—either via an initial connection to the cloud or as an extra step in manufacture.

FIG. 6 shows an offline scenario example that involves device 601 proving to a PC that it is a legitimate device. For instance, in some examples, this could be used by service technicians to authenticate devices before installing new software or taking other actions.

In some offline authentication scenarios, a program running on a PC may wish to establish that a connected device is authentic. For example, a service technician may want to verify that a valid device is attached before updating software. In order to secure this connection, in this example, the PC sends a certificate to the device for authentication before it can release its identity information. In some examples, this certificate is issued via cloud services and must chain up to a common CA chain so that the device can validate it.

In the illustrated example, first, step 1 occurs. At step 1, in some examples, as a start of the authentication request, PC 602 establishes an SSL connection with device 601 over a network transport. In some examples, PC 602 authenticates to device 601 via TLS by providing a certificate chained up through a common CA.

At step 2, in some examples, PC 602 requests an authentication challenge. In some examples, as part of this operation, PC 602 generates a request-specific nonce value and sends the nonce value to device 601.

At step 3, in some examples, device 601 receives the nonce from PC 602. Device 601 may then concatenate the public key PC 602 authenticated with the nonce and store that value in DR1. In some examples, device 601 then computes the final digest by executing the DR_Sign_ECC security complex operation.

At step 4, in some examples, device 601 sends the digest, signature, its device certificate, and the measurement list to PC 602.

At step 5, in some examples, PC 602 first validates that device certificate is valid and signed via a trusted CA. In some examples, PC 602 then computes the digest value by repeating the steps device 601 took in step 3. In some examples, PC 602 validates the signature and confirms the identity of device 601. In some examples, at this point PC 602 may choose to further validate the software that is on device 601 by looking at the measurement list.

FIG. 7 is a diagram illustrating a dataflow for a system (700) that may be employed as an example of system 300 of FIG. 3. In some examples, system 700 includes device A and device B. Device A and device B may be examples of device 200 of FIG. 2 in some examples.

FIG. 7 illustrates an example of a second offline scenario that involves a set of locally connected devices. For instance, the scenario may apply to a device that uses Wi-Fi ad-hoc networks to create a wireless LAN for device to device communication. The process may be used to authenticate devices with each other in a secure way that doesn't require internet connectivity.

In some examples, for offline authentication scenarios that require connecting to a device to authenticate, in order to ensure that the connection is secure, TLS is used to provide HTTPS as a transport. In some examples, this uses a SSL certificate that the device uses to identify itself.

In the illustrated example, first, step 1 occurs. At step 1, in some examples, as a start of the authentication request, device A establishes an SSL connection with device B.

At step 2, in some examples, Device A requests an authentication challenge. In some examples, as part of this operation, device A generates a request-specific nonce value and sends the nonce value to device B along with device certificate of device A.

At step 3, in some examples, Device B validates that the received certificate is chained through a trusted CA. Device B may then generate a nonce and send the nonce along with the device certificate of device B to device A.

At step 4, in some examples, Device A validates the received certificate. In some examples, device A concatenates the public key of device B with the nonce and stores that value in DR1. In some examples, device A then computes the final digest by executing the DR_Sign_ECC security complex operation.

At step 5, in some examples, Device A sends the digest, signature, and the measurement list to device B.

At step 6, in some examples, Device B validates the digest and signature sent to device B by repeating the steps of security complex operation.

At step 7, in some examples, Device B computes its own final digest.

At step 8, in some examples, Device B sends the digest, signature, and measurement list to device A.

At step 9, in some examples, Device A validates the provided digest and signature, completing mutual authentication for this session.

Figure 8:
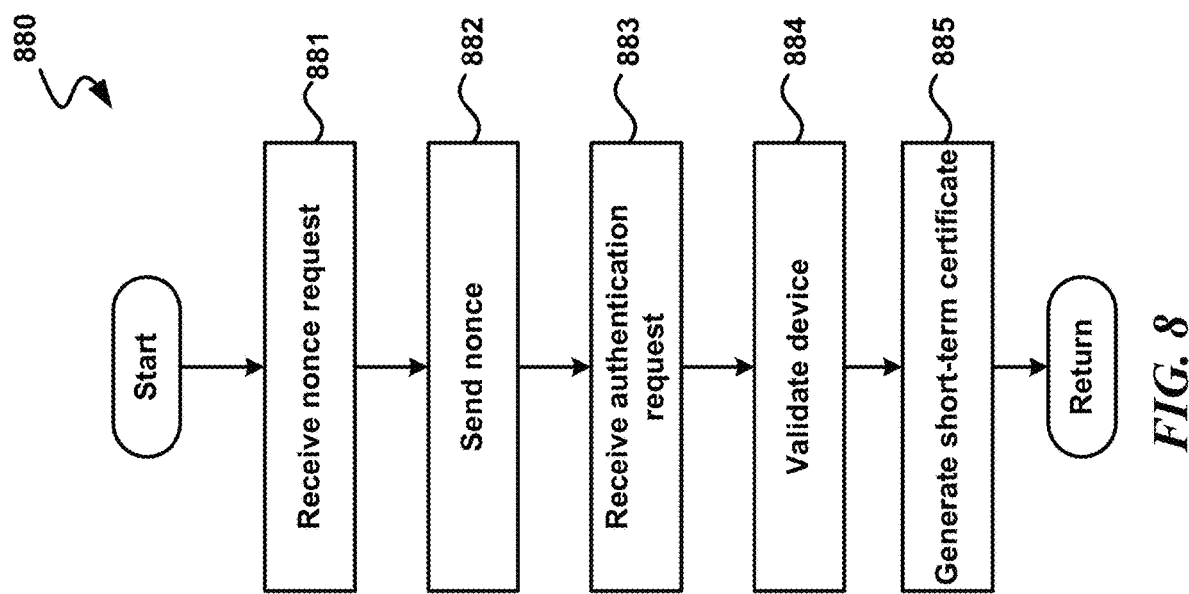
FIG. 8 is a flow diagram illustrating an example process, in accordance with aspects of the disclosure.

FIG. 8 is a flow diagram illustrating an example process. In the illustrated example, step 881 occurs first. At step 881, in some examples, a request for a nonce from a device is received. As shown, step 882 occurs next in some examples. At step 882, in some examples, the nonce is sent in response to the request. As shown, step 883 occurs next in some examples. At step 883, in some examples, an authentication request that includes the nonce, a set of measurements associated with the device, and a cryptographic signature generated from a private key associated with the device is received.

As shown, step 884 occurs next in some examples. At step 884, in some examples, the device is validated based on the authentication request. At step 885, in some examples, in response to successful validation of the device, a short-term certificate is generated for the device. The process may then proceed to the return block, where other processing is resumed.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus, comprising:
a device including at least one memory adapted to store run-time data for the device, and at least one processor that is adapted to execute processor-executable code that, in response to execution, enables the device to perform actions, including:
receiving a request for a nonce from a device;
sending the nonce in response to the request;
receiving an authentication request that includes the nonce, a set of measurements associated with the device, and a cryptographic signature generated from a private key associated with the device, wherein the authentication request is a request for a short-term certificate;
validating the device based on the authentication request; and
in response to successful validation of the device, generating the short-term certificate for the device.

2. The apparatus of claim 1, wherein the set of measurements indicate versions of software running on the device.

3. The apparatus of claim 1, wherein the set of measurements include a value of an accumulation register, wherein a hash of each software stage booted by the device is cryptographically appended to the accumulation register, and wherein validating the device includes validating the value of the accumulation register.

4. The apparatus of claim 1, wherein the short-term certificate is valid for less than forty-eight hours.

5. The apparatus of claim 1, wherein the short-term certificate serves as authentication of the device until expiration of the short-term certificate.

6. The apparatus of claim 1, the actions further including, before receiving the request for the nonce, establishing a secure sockets layer connection with the device.

7. The apparatus of claim 1, wherein the validating the device includes looking up a public key associated with the device to validate that the device is a registered device.

8. The apparatus of claim 1, wherein validating the device includes validating that all software running on the device is trusted.

9. The apparatus of claim 1, wherein validating the device includes using a public key associated with the private key to verify the cryptographic signature.

10. The apparatus of claim 1, wherein the set of measurements includes at least one hardware identity (ID), and wherein validating the device includes validating the at least one hardware ID.

11. The apparatus of claim 1, wherein the set of measurements includes an indication of a boot source, and wherein validating the device includes validating the boot source.

12. The apparatus of claim 1, wherein the device includes a set of independent execution environments arranged in a defense-in-depth hierarchy, including at least a first independent execution environment and a second independent execution environment; upon the device being booted, the device boots in stages such that the independent execution environments boot one at a time, with each independent execution environment after the first being validated and booted by the preceding independent execution environment; the set of measurements includes a value of an accumulation register; a hash of each independent execution environment booted by the device is cryptographically appended to the accumulation register; and wherein validating the device includes validating the value of the accumulation register.

13. A method, comprising:
receiving, from a device, a nonce request;
responsive to the nonce request, communicating a one-time cryptographic nonce to the device;
receiving an authentication request that includes the one-time cryptographic nonce, a set of measurements associated with the device, and a cryptographic signature generated from a private key associated with the device, wherein the authentication request is a request for a short-term certificate;
responsive to the authentication request, authenticating the device; and
responsive to successful authentication of the device, creating a short-term client certificate for the device.

14. The method of claim 13, wherein the set of measurements include a value of an accumulation register, wherein a hash of each software stage booted by the device is cryptographically appended to the accumulation register, and wherein authenticating the device includes verifying the value of the accumulation register.

15. The method of claim 13, wherein the short-term device certificate serves as authentication of the device until expiration of the short-term client certificate.

16. The method of claim 13, wherein authenticating the device includes verifying that all software running on the device is trusted.

17. A processor-readable storage medium, having stored thereon processor-executable code that, upon execution by at least one processor, enables actions, comprising:
receiving an authentication request that includes a nonce, a set of measurements associated with the device, and a cryptographic signature generated from a private key associated with the device, wherein the authentication request is a request for a short-term certificate;
authenticating the device based on the authentication request; and
in response to successful validation of the device, generating a short-term certificate for the device.

18. The processor-readable storage medium of claim 17, wherein the set of measurements include a value of an accumulation register, wherein a hash of each software stage booted by the device is cryptographically appended to the accumulation register, and wherein authenticating the device includes verifying the value of the accumulation register.

19. The processor-readable storage medium of claim 17, wherein the short-term certificate serves as authentication of the device until expiration of the short-term certificate.

20. The processor-readable storage medium of claim 17, wherein authenticating the device includes verifying that all software running on the device is trusted.

* * * * *